(12) United States Patent
Gómez Garcia et al.

(10) Patent No.: US 12,212,277 B2
(45) Date of Patent: Jan. 28, 2025

(54) UNIVERSAL JOINT BETWEEN SECTIONS OF A STRUCTURE

(71) Applicant: TRINA SOLAR, S.L.U., Madrid (ES)

(72) Inventors: Juan Manuel Gómez Garcia, Madrid (ES); Abraham Ruiz Molinero, Madrid (ES); Daniel Gonzalez Garcia, Madrid (ES)

(73) Assignee: TRINA SOLAR SPAIN, S.L.U., Madrid (ES)

( * ) Notice: Subject to any disclaimer, the term of this patent is extended or adjusted under 35 U.S.C. 154(b) by 0 days.

(21) Appl. No.: 18/335,531

(22) Filed: Jun. 15, 2023

(65) Prior Publication Data

US 2024/0213910 A1 Jun. 27, 2024

(30) Foreign Application Priority Data

Dec. 21, 2022 (ES) ................. ES202231092

(51) Int. Cl.
*H02S 20/32* (2014.01)
*F16C 1/08* (2006.01)

(52) U.S. Cl.
CPC ............. *H02S 20/32* (2014.12); *F16C 1/08* (2013.01)

(58) Field of Classification Search
CPC ....................................................... H02S 20/32
See application file for complete search history.

(56) References Cited

U.S. PATENT DOCUMENTS

| | | |
|---|---|---|
| 2014/0054433 A1 | 2/2014 | Reisch et al. |
| 2020/0052644 A1 | 2/2020 | Taha et al. |
| 2022/0190776 A1* | 6/2022 | Taha ............... F16B 7/0406 |

FOREIGN PATENT DOCUMENTS

| | | |
|---|---|---|
| CN | 203788228 U | 8/2014 |
| CN | 106533343 A | 3/2017 |

OTHER PUBLICATIONS

Search Report for Corresponding Spanish Patent Application No. P 202231092, 4 pages.

* cited by examiner

*Primary Examiner* — Jayne L Mershon
(74) *Attorney, Agent, or Firm* — LUCAS & MERCANTI, LLP

(57) ABSTRACT

A universal joint to join inclined sections (2) of a rotating shaft of a solar tracker. The universal joint consists of a crosshead (1) with parts (1.1) perpendicular to each other, two clamps (3) able to be fixed to each inclined section (2) at the ends thereof to be joined, such that each part (1.1) of the crosshead (1) is arranged inside a clamp with freedom of rotation on the plane thereof and at least one side cover (3.2) for each clamp (2) that retains the corresponding part (1.1) of the crosshead (1) perpendicular to the plane.

12 Claims, 5 Drawing Sheets

UNIVERSAL JOINT BETWEEN SECTIONS OF A STRUCTURE

CROSS-REFERENCE TO RELATED APPLICATION

This application claims the benefit of priority from Spanish Patent Application No. P 202231092, filed Dec. 21, 2022, the contents of which are incorporated herein by reference.

TECHNICAL FIELD

The present invention relates to universal joints, especially for the structure of a solar tracker supporting one or more photovoltaic solar panels, which orient said solar panels, making them rotate with the shaft so that the sun's rays hit the panels in an optimal way for energy production.

BACKGROUND OF THE INVENTION

The use of solar trackers by means of a continuous shaft in the form of a straight line with different support points is known in the technical sector. These supports consist of pillars on which bearings are placed to allow the shaft to freely rotate. Solar panels are placed on said shaft in an integral way so that when actuator means rotate the rotating shaft, all the solar panels of the solar tracker rotate with the shaft. This allows the position of the solar panels to be controlled at all times, thus allowing them to be oriented in the best possible way.

It is known that, with regard to solar trackers, planning is very important in order to optimise the area of the land, with the aim of placing the largest amount of solar panels in the smallest possible space, while at the same time ensuring maximum use of the panels' capacity. This is why there is a tendency to install them on flat ground, making it necessary to compete against other uses of such land, such as agricultural uses.

Furthermore, uneven land creates problems for solar trackers, given the unevenness and different heights of the terrain, preventing the use of a straight and continuous shaft. The way to overcome this problem is to have a plurality of solar trackers with different respective shafts, supports and actuation means, which leads to an increase in costs and a waste of space.

One way to address the problem is disclosed in the patent document WO-2018075368-A1, wherein Cardan-type universal joints are placed on the support pillars to obtain a continuous shaft with different directions. In this way, the shaft is split in two on the pillar and joined by the universal joint which allows the shaft to rotate in a continuous way. The main problem with this system is that the joint that allows for a change of direction in the solar shaft is weak, and therefore it needs at least one pillar to support the two ends of the sections that form the shaft. Additionally, these Cardan-type joints have the drawback of being ineffective for large shafts, since the stress put on the joint is very high and a large Cardan joint implies a high cost, as well as technical complications given the complexity of the pieces it is made up of.

In view of the disadvantages or limitations of the currently existing solutions, it is necessary to provide a universal joint that allows different sections of a solar tracker shaft to be joined to overcome the problem of uneven terrain by means of different inclinations, in a robust way that allows different types of shafts to be supported and adapted.

SUMMARY OF THE INVENTION

The object of the invention is a universal joint to join inclined sections of a rotating shaft of a solar tracker. The universal joint according to the invention consists of a crosshead with two parts perpendicular to each other, two clamps that can be fixed to each inclined section to be joined at the ends thereof, so that each crosshead part is arranged inside the corresponding clamp with freedom of rotation in the plane thereof, and with at least one side cover for each clamp that retains the corresponding crosshead part in a perpendicular direction to that of said plane of rotation coinciding with the plane of the clamp.

In this way, it is possible to connect two sections of the solar tracker with different directions, inclined with respect to each other, to overcome the unevenness of the terrain and allow for rotational motion to be transmitted between the same.

The crosshead therefore has two perpendicular planes, each of the perpendicular planes being the same as the plane of the clamp that retains them. In this way, the crosshead part rotates on the plane thereof inside the corresponding clamp, in order to allow rotation to be transmitted between sections, the plane of the clamp being considered the fastening plane of the corresponding crosshead part.

Preferably, the crosshead parts that form the perpendicular planes are in the form of discs, preferably circular. Alternatively, they could be other geometric shapes, such as octagons or dodecagons, as long as free rotation is allowed between the crosshead part and the clamp that retains it.

This universal joint is arranged at the necessary points of the solar tracker where the use of inclined sections is required to overcome uneven terrain. In this way, a continuous solar tracker with different inclined sections is obtained, which can be activated by a single motor element. Thus, a solar tracker can make use of the available space in the best possible way, also using the slopes of the land in a continuous way.

The clamps are preferably able to be fixed by means of a base at the end of each section, being fixed by welding or by mechanical means, or by any other method. On the part of the clamp opposite this fastening, the clamp consists of a body, arranged to receive a crosshead part. To carry out the assembly thereof, the clamp has at least a cover that can be attached to the clamp body. In this way, the crosshead part is placed in clamp body, inserted inside, and is subsequently retained by the cover fixed to the clamp body. As such, the plane of the crosshead part and the clamp are the same.

Optionally, the clamp is C-shaped and is made up of an arc that preferably encompasses an angle greater than 180 degrees, which means that it clamps more than half the perimeter of the crosshead part. This prevents the crosshead from being extracted in the direction of the section, so the minimum required angle depends on the difference in diameter between the "C" shape and the disc. This geometry and embodiment requires the disc only be introduced vertically to the plane of the "C".

Optionally, the clamp has a cover that protrudes on one of the faces of the body, integrated with the body and forming a single piece with the same, in such a way that it prevents the crosshead part from coming out through said face of the clamp once inserted, acting as a stop. To prevent the crosshead part from coming out once inserted, the clamp incorporates another cover that is fixed to the clamp body on the other side.

Alternatively, the clamp body is flat, without any protruding cover. In this case, it is necessary to fix covers on both sides of the clamp body to retain the disc. Preferably, the cover is fixed on one side of the clamp, so that it acts as a stop, and after inserting the crosshead part in the clamp, the cover is fixed on the other side of the clamp. To fix the covers by mechanical means, through bolts and nuts, for example, can be used to simultaneously retain the covers on both sides simplifying the process.

When the universal joint is assembled and in use, the covers retain the crosshead part on the sides of the clamp body, leaving the central area of the crosshead free. This leaves all the freedom of movement to the crosshead part perpendicular to the part retained in the clamp, and at the same time that it prevents the clamp from coming out of the retained part.

Optionally, the clamp can have a plurality of covers arranged on each side of the clamp body to retain the crosshead part.

The clamp allows for the free rotation of the crosshead part, so that it has a certain play that allows rotation. The crosshead slides in contact with the clamp body and covers. That is why systems that are conducive to sliding can be incorporated, such as coatings of low-friction materials or the use of lubricants. The contact areas could also be polished to reduce friction.

The crosshead has a geometry formed by two parts that form perpendicular planes. Preferably, said crosshead parts have the shape of flat and preferably circular discs. Each disc is arranged to be retained by a different clamp. The diameter of the disc and the internal dimensions of the clamp must be coherent so that there is not too much pressure, which would make it difficult to slide, nor too much play, which would make it prone to fluctuation.

In a preferred embodiment, discs of the same diameter arranged perpendicularly are envisaged. Said disc-shaped crosshead parts can be cylindrical, with a straight edge or curved edge that facilitates rotation with respect to the clamp. Optionally, the crosshead parts do not have to be solid, and can have openings that reduce the weight of the crosshead or have cuts that facilitate rotation without colliding with the covers.

Preferably, the crosshead is made of a stress-bearing metal material, which can be polished to facilitate sliding. In the same way, the clamps can be made of metal materials, allowing the inner faces in contact with the crosshead to be polished, so as to reduce friction.

The universal joint according to the invention allows for a homokinetic transmission of rotation, meaning it allows both sections of the universal joint to rotate at the same angular velocity.

The universal joint can be located at any point of the solar tracker, formed by inclined sections supported by at least one pillar, the sections and pillars being connected by bearings. The two sections supported on two different pillars can have a universal joint at any point between the pillars. This is possible thanks to the robustness of the universal joint, which allows the universal joint to be located at a distance from both pillars since it does not require contiguous supports for the ends of the section it connects.

In an alternative embodiment, in one span, it is envisaged that there may be more than one universal joint between different sections. The span is understood to mean the space between the pillars that is occupied by at least part of the solar tracker. This allows a section to be supported by two universal joints without relying on any pillars or bearings. The intermediate section would be limited to the bearing capacity of the joints by not having a pillar for the support thereof. This may be necessary to overcome large gaps that cannot be overcome with a single universal joint.

As a complement to the universal joints, the pillar bearings can be spherical, thus allowing greater adaptability of the sections. This facilitates the placement of the pillars as it does not require such precise positioning, as is the case with cylindrical bearings, for example.

Given the simplicity of the design, the parts can be brought to the facility and assembled on-site during the assembly of the solar tracker. This facilitates the adaptation and fastening of the elements while at the same time allowing for easy transport.

An important advantage of this universal joint is that it allows for the transmission of high torque at low speeds. Since the crosshead is firmly secured in the clamp, when moving at a low speed the two elements slide with respect to each other. Given that this occurs at low speeds, the friction is negligible and does not pose a problem for operation.

Additionally, the universal joint according to the invention is suitable for the transmission of the rotation of shafts of large sections. The clamps and crosshead can be built proportionally to the size of the sections, thus avoiding the concentration of large stresses. Given the simple design thereof, it does not require great complexity or special elements, such as large bearings, and the joint can be adapted to the different sizes required, in a cheap and simple way.

In a preferred embodiment, the different elements of the universal joint can be made from the same sheet of material, such as metal, for example. By means of laser cutting, for example, on said sheet, the profile of the different elements can be made, which can later be joined and form the clamps and the crosshead. Optionally, in the case of requiring greater reinforcement, as in the case of the clamp body or the crosshead discs, several cuts of the material sheet can be superimposed to double the thickness of the piece.

In this way, the proposed solution presents a simpler and more robust universal joint than those which are known. Given the simple shapes thereof, less precision is required in the finish or in the dimensions than in other rotation transmission systems. Moreover, the use of flat elements implies a lower cost than the use of gears or bearings with a more difficult construction. Therefore, this solution solves the problems mentioned in the state of the art.

DETAILED DESCRIPTION OF THE INVENTION

Figure 1:
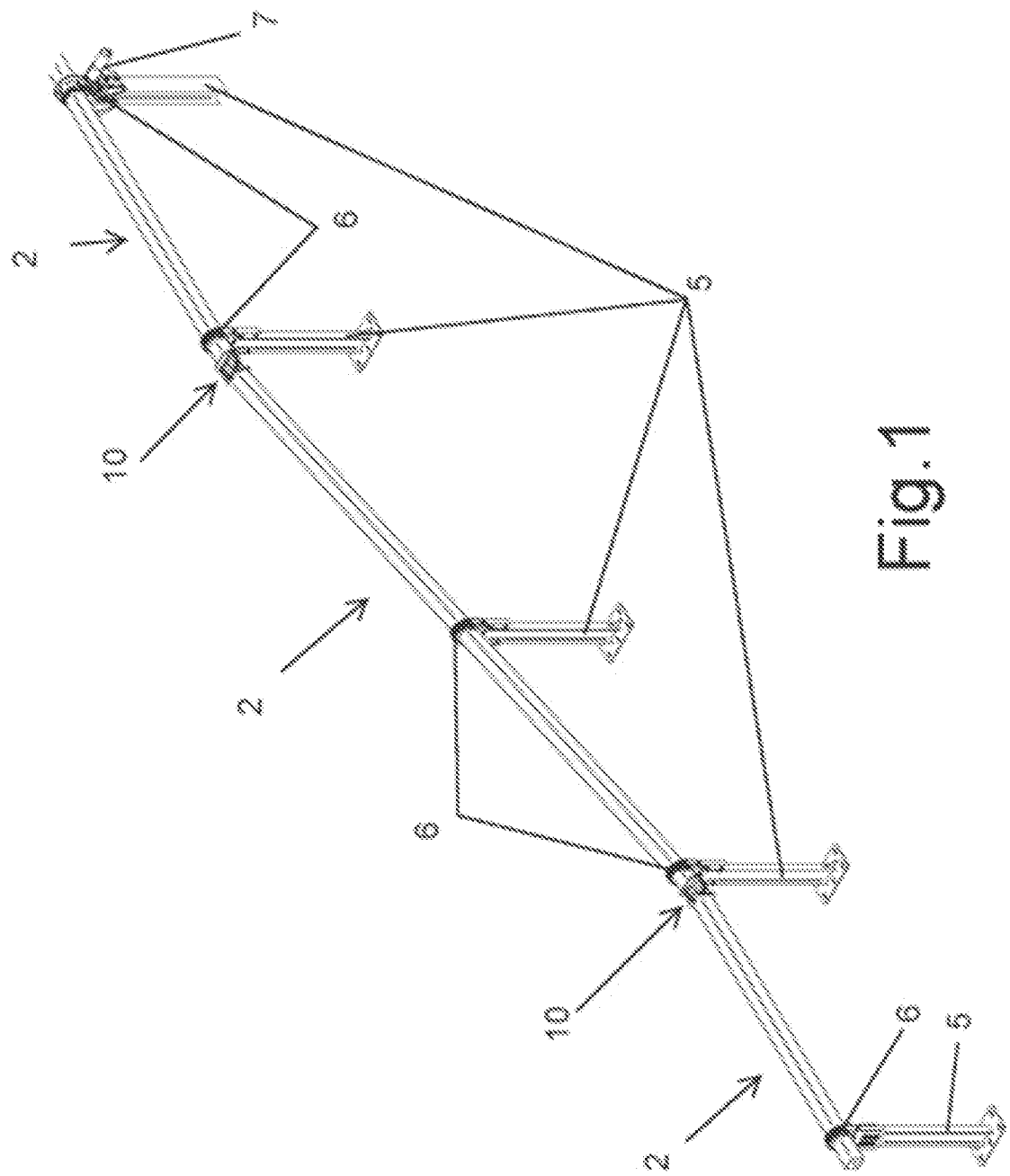
FIG. 1 shows an embodiment of a solar tracker with two universal joints according to the invention at different points.

The figures correspond to non-limiting examples of practical embodiments, variations being allowed in the formation of the universal joint according to the invention, provided that the essence thereof is not altered. The universal joint (10) comprises a crosshead (1), a clamp (3), located at the end of a section (2), and another clamp (3) for another section (2) of the solar tracker. In this way, the inclined sections (2) are connected, transmitting rotation along the solar tracker.

As can be seen in FIG. 1, the universal joint (10) can be arranged at any point of the solar tracker, such as in the spans formed by the sections (2) between pillars (5) and bearings (6). In this case shown, each pillar (5) and bearing (6) supports a different section (2), the crosshead (1) being the element that transmits movement from one section (2) to the other. In this way, it can be seen how a single motor element (7) connected to a section (2) transmits the rotational movement to other sections (2) with different inclinations by means of universal joints that comprise the clamps (3) and the crossheads (1).

Specifically, FIG. 1 shows three sections (2) with different inclinations, connected by two universal joints (10) located in spans. In the sections (2) located at the ends of the solar tracker, only the clamps (3) are fixed at the end of the section (2) to be connected, while in the intermediate section (2) the clamps (3) are fixed at both ends.

On the other hand, it can be seen how the two sections (2) on the right are each supported by two pillars (5). However, the section (2) on the left is only supported by one pillar (5), the universal joint (10) of the invention supporting the section (2) on the left when connected to another section (2).

Figure 2:
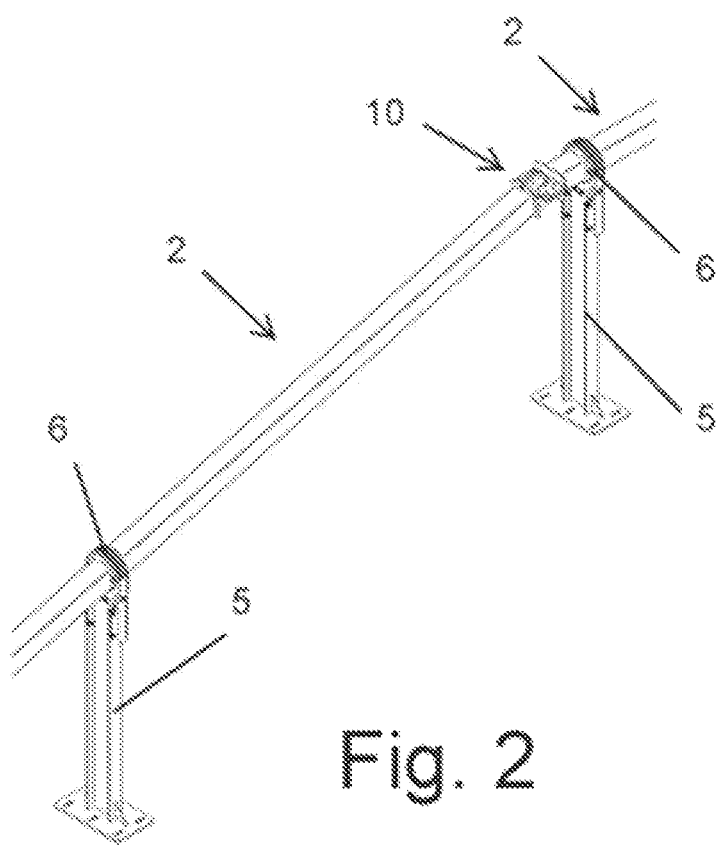
FIG. 2 shows a perspective view of a solar tracker span formed by two pillars and two sections and with a universal joint according to the invention.

FIG. 2 shows a preferred embodiment, wherein the universal joint (10) is located close to a pillar (5). This example is not limiting, since the universal joint (10) could be located at any point between the pillars (5). Additionally, the universal joint (10) could be located between two very close pillars (5), or even on a pillar (5) with two bearings (6) on the sides of the universal joint (10).

The bearings (6) shown in this embodiment are spherical, which allows for greater adaptation to the terrain. The pillars (5) do not require precision or alignment with the section (2) in the installation thereof.

Figure 3:
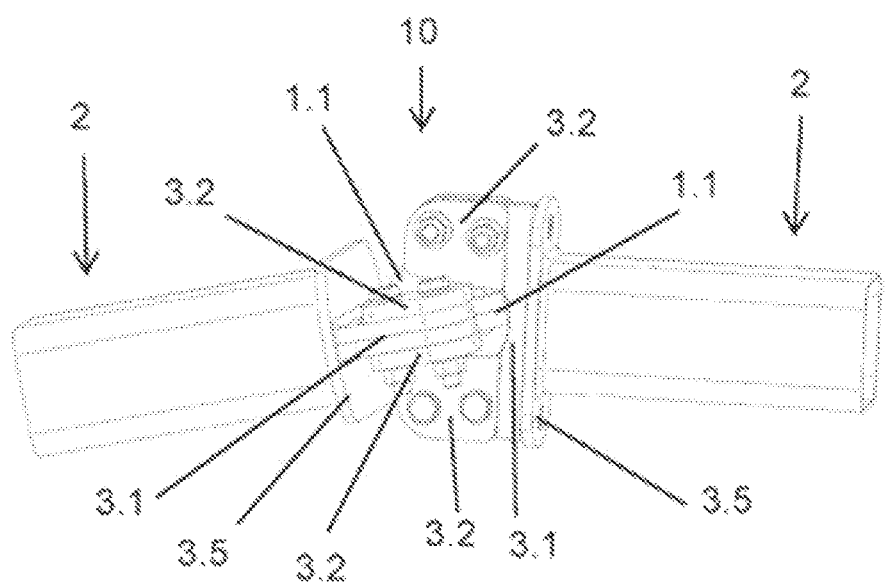
FIG. 3 shows a detail of the universal joint, showing the end of two sections and the joining thereof.

FIG. 3 shows a detailed view of the universal joint (10) between two sections (2). Each of the clamps (3) comprises a base (3.5) that allows the same to be fixed to the section (2). Said fixing can be done by means of welding beads, or any other system or method that fixes the section to the base, such as by screws. On the other hand, it can be seen that the crosshead (1) is secured between the clamps (3) of each section (2). The crosshead (1) is supported by the sections (2) themselves, which have a fixed rotating position that prevents them from moving, leaving a constant space between sections (2) in which the crosshead (1) is located. If the clamps (3) are too far apart, the crosshead (1) will have less retention or less of a free arc to rotate. If the clamps (3) are too close, the crosshead (1) may not enter, or enter with too much pressure, causing greater friction in the rotation of some parts (1.1) of the crosshead (1) in the case of the preferred embodiment shown in the figures, the crosshead parts (1) preferably being two discs (1.1) perpendicular to each other, but not limited to other geometries that allow the parts (1.1) of the crosshead (1) to rotate inside the corresponding clamp (3).

Each of the clamps (3) rotates in a way so as to maintain perpendicularity. In turn, these perpendicular planes correspond to the perpendicular planes formed by the discs (1.1) of the crosshead (1). Each clamp (3) is fixed to a disc (1.1), and given that said discs (1.1) are perpendicular, the clamps (3) are always on perpendicular planes. The sliding of the crosshead (1) and the discs (1.1) in the clamps (3) is therefore necessary for the correct positioning of the crosshead (1) in each rotation, rotating simultaneously on both planes.

Figure 4:
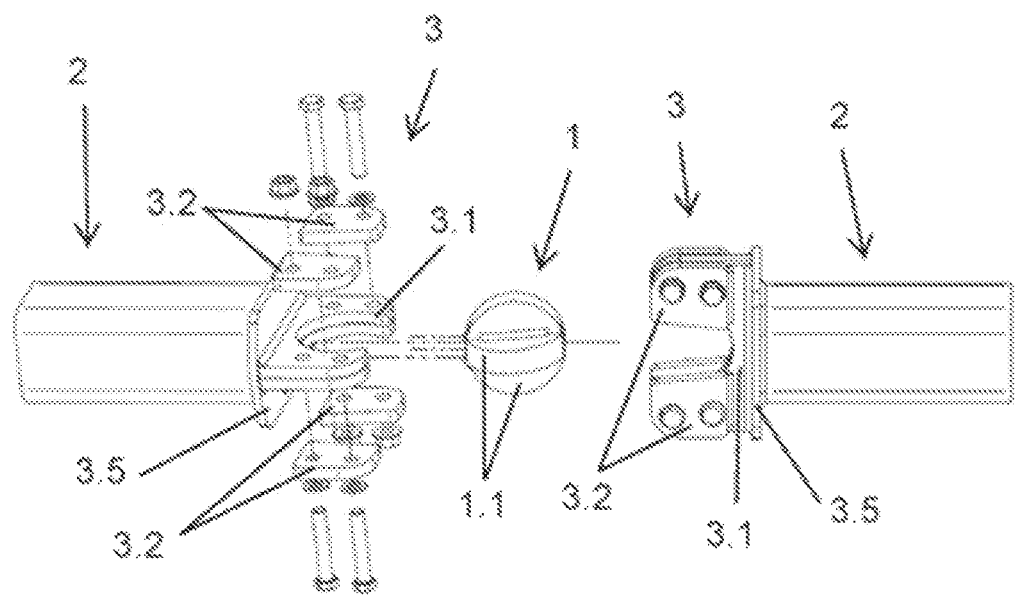
FIG. 4 shows an exploded view of a clamp located at the end of a section, the crosshead and another section with the clamp mounted.

FIG. 4 shows the parts that make up the clamp (3), facilitating the explanation of the assembly thereof. The clamp (3) comprises a body (3.1) formed by a plane with a C-shaped opening, such that it can receive a disc (1.1). It can also be seen how the "C" shape spans an angle greater than 180°, which forces the disc (1.1) to be inserted vertically to the plane on which the clamp (3) extends. In this way, along with the covers (3.2), which prevent movement in the direction vertical to the plane formed by the clamps (3), the disc (1.1) is secured, preventing the same from coming out, but allowing the rotation thereof.

In the embodiment shown, the clamp (3) comprises four covers (3.2) which are fixed to the sides of the "C" shape of the body (3.1) on both faces. The fixing of these covers (3.2) is preferably done by means of mechanical fixing systems, such as the one shown in this embodiment. Alternatively, they could be attached by other means, such as welding.

According to the image, during the installation of the crosshead (1), one of the discs (1.1) is inserted into the body (3.1) in the C-shaped part. Subsequently, the covers (3.2) are placed by fixing them using mechanical fixing means, such as by screwing. If there are covers (3.2) integrated into the body (3.1) itself, the covers (3.2) are fixed on a single face. If the covers (3.2) are welded, the covers (3.2) could be fixed on one side first, and subsequently the other covers could be fixed on the other side after inserting the disc (1.1).

In the embodiment shown, the covers (3.2) are simultaneously fixed on both sides of the body (3.1) by mechanical means. This makes it necessary to place the disc (1.1) inside the "C" shape and place and fix the covers (3.2) at the same time, maintaining the position thereof.

Figure 5:
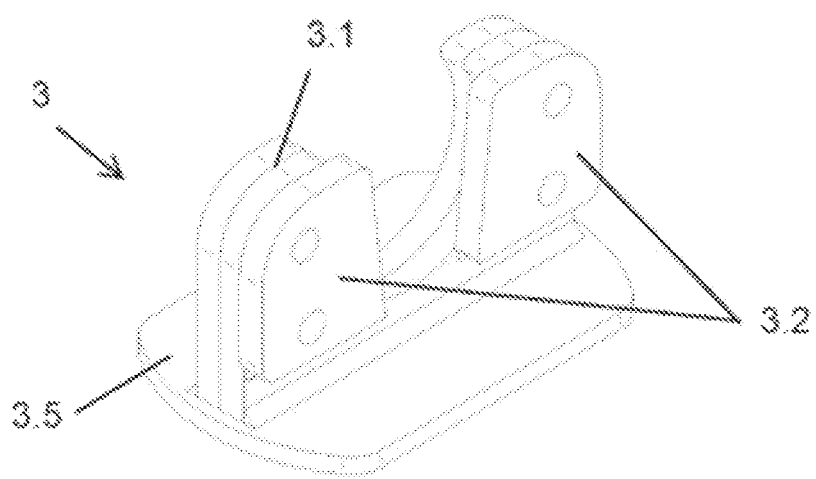
FIG. 5 shows a perspective view of a clamp according to one embodiment, without the cover on one side of the body.

In FIG. 5, a clamp (3) is shown. These clamps (3) can be distributed assembled with an additional cover (3.2) and with the crosshead (1) for the placement thereof in any set of sections (2) of a rotating shaft. Also, the dimensions thereof can be adapted to the dimensions of the section of the span. In this way, this universal joint (10) design is easily scalable, as it does not have complex elements, such as bearings, which become more complex as the size increases.

One way of constructing the elements that make up the universal joint (10) can be from a sheet with a consistent cross section. In this way, the different parts, such as the body (3.1) and the covers (3.2) or the discs (1.1) can be cut from said sheet and assembled by welding to form the clamps (3) or the crosshead (1). Alternatively, they can be made by moulding or any other way.

Figure 6A:
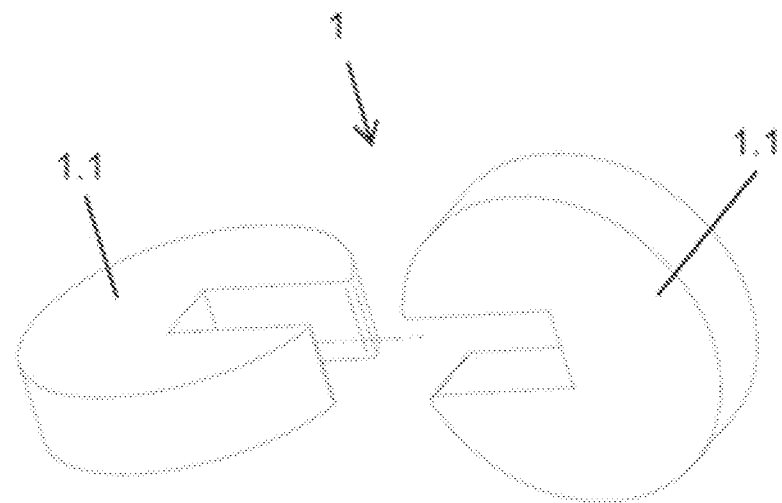
FIGS. 6a and 6b show perspective views of the crosshead according to one embodiment.
Figure 6B:
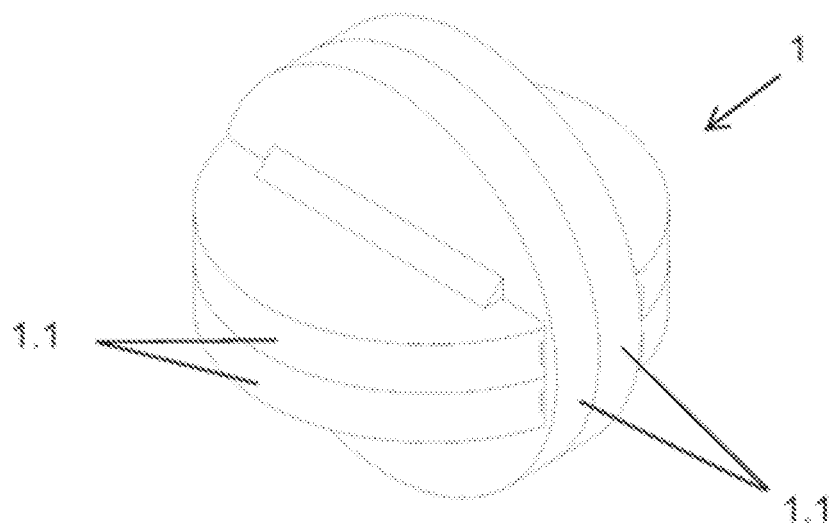

FIG. 6a and FIG. 6b show an embodiment of the crosshead (1) formed by two insertable discs (1.1). The two cylindrical discs (1.1), which have a radial slot with a width equal to the thickness of the disc (1.1), both insertable, are rotated 90° with respect to each other, as shown in these figures. For a secure fastening, a weld bead can be applied, as shown in FIG. 6b, for example.

In an alternative embodiment, not shown in the figures, the crosshead (1) can be made by different processes, such as placing two semicircles perpendicular to a disc (1.1) to form the perpendicular disc (1.1). Another embodiment could be by fitting each semicircle of the crosshead (1) on a common shaft. Said joint must be strong enough to withstand the stresses. Additionally, the discs (1.1) can be reinforced by doubling the thickness thereof or using reinforcing ribs.

The invention claimed is:

1. A universal joint to join inclined sections of a rotating shaft of a solar tracker, comprising a crosshead with first and second parts fixed perpendicularly to each other, two clamps fixed to each inclined section at the ends thereof to be joined, such that each of the first and second parts of the crosshead is arranged inside a different clamp with freedom of rotation on the plane thereof and at least one side cover for each clamp that retains the corresponding part perpendicular to said plane.

2. The universal joint between sections for a solar tracker according to claim 1, wherein the first and second parts of the crosshead are disc-shaped.

3. The universal joint between sections for a solar tracker according to claim 1, wherein the clamps are C-shaped on the inside where a corresponding one of the first or second parts of the crosshead is arranged.

4. The universal joint between sections for a solar tracker according to claim 3, wherein the "C" shape of the pieces consists of an arc that spans an angle greater than 180 degrees.

5. The universal joint between sections for a solar tracker according to claim 1, wherein the clamp comprises a plurality of covers fixed to the body on the sides.

6. The universal joint between sections for a solar tracker according to claim 1, wherein the clamp can be fixed by means of a base to the section at the end thereof.

7. The universal joint between sections for a solar tracker according to claim 1, wherein the crosshead and/or the clamps are made of the same material.

8. The universal joint between sections for a solar tracker according to claim 1, wherein:
the first part comprises a first radial slot with a width equal to the thickness of the first part; and
the first part is adapted to be coupled to the second part by engaging the first radial slot with a corresponding second radial slot of the second part.

9. A solar tracker comprising inclined sections of rotating shafts joined together by a universal joint according to claim 1.

10. The solar tracker with universal joints according to claim 9, further comprising at least one pillar to support the sections by means of bearings.

11. The solar tracker with universal joints according to claim 9, wherein the universal joints are arranged between said pillars in the cantilevered sections.

12. The solar tracker with universal joints according to claim 9, wherein at least one of the bearings is spherical.

* * * * *